US012411437B2

(12) United States Patent
Tsuji et al.

(10) Patent No.: US 12,411,437 B2
(45) Date of Patent: Sep. 9, 2025

(54) TONER CONTAINER AND IMAGE FORMING APPARATUS INCLUDING THE TONER CONTAINER

(71) Applicant: KYOCERA Document Solutions Inc., Osaka (JP)

(72) Inventors: Hirofumi Tsuji, Osaka (JP); Masahiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/779,358

(22) Filed: Jul. 22, 2024

(65) Prior Publication Data

US 2025/0036044 A1 Jan. 30, 2025

(30) Foreign Application Priority Data

Jul. 27, 2023 (JP) ................................ 2023-122339

(51) Int. Cl.
*G03G 15/08* (2006.01)

(52) U.S. Cl.
CPC ..... *G03G 15/0872* (2013.01); *G03G 15/0886* (2013.01)

(58) Field of Classification Search
CPC ....................... G03G 15/0872; G03G 15/0886
USPC ................................ 399/120, 252, 258, 262
See application file for complete search history.

(56) References Cited

U.S. PATENT DOCUMENTS

| | | | | |
|---|---|---|---|---|
| 12,332,585 | B2 * | 6/2025 | Fujiwara | B32B 5/32 |
| 2017/0293240 | A1 | 10/2017 | Murata | G03G 15/0881 |

FOREIGN PATENT DOCUMENTS

| | | | |
|---|---|---|---|
| JP | H 09-197783 | A | 7/1997 |
| JP | 2018045149 | * | 3/2017 |
| JP | 2017-187672 | A | 10/2017 |

* cited by examiner

*Primary Examiner* — Hoan H Tran
(74) *Attorney, Agent, or Firm* — Stein IP, LLC

(57) ABSTRACT

The toner container includes a container body, a transmission gear, a cap member, and a seal member. The transmission gear is fitted to the container body under a circumferential-movement restricted condition, and transmits rotation driving force to the container body. The cap member covers an opening of the container body, and retains a rotation-halted state while the container body and the transmission gear are rotating. The seal member is placed between the container body and the cap member. The transmission gear has a large-diameter portion larger in outer diameter than the other portions. The cap member includes a body portion, and a cylindrical-shaped retaining portion protruded from the body portion in a rotational-axis direction. A fore end portion of the retaining portion is in contact with a step gap portion on one side of the large-diameter portion closer to the cap member.

5 Claims, 7 Drawing Sheets

TONER CONTAINER AND IMAGE FORMING APPARATUS INCLUDING THE TONER CONTAINER

INCORPORATION BY REFERENCE

This application is based on and claims the benefit of priority from Japanese Patent Application No. 2023-122339 filed on Jul. 27, 2023, the contents of which are hereby incorporated by reference.

BACKGROUND

The present disclosure relates to a toner container being for use of containing toner and to be fitted to an image forming apparatus using electrophotographic process, and further relates to an image forming apparatus including the toner container.

In an image forming apparatus of the electrophotographic process, toner is fed from a developing unit to an electrostatic latent image formed on a surface of an image carrier (e.g., photosensitive drum), allowing development process to be fulfilled. Toner to be used for such development process is fed from a toner container to the developing unit. The toner container is, for example, equipped with a container body that rotates while containing toner.

With a toner container of such a configuration as described above, there are some cases where an opening of the container body is covered with a cover which does not rotate during the rotation of the container body. In such a case, toner leakage is more likely to occur from between the container body and the cover, as compared with cases in which the cover rotates integrally with the container body during the rotation of the container body.

SUMMARY

A toner container according to one aspect of the present disclosure includes a container body, a transmission gear, a cap member, and a seal member, the toner container being fittable to and removable from an image forming apparatus. The container body, being cylindrical-shaped, rotates while containing toner. The transmission gear, being cylindrical-shaped, is fitted to a one-end-side outer circumferential surface of the container body under a circumferential-movement restricted condition, and transmits rotation driving force to the container body. The cap member covers an opening provided at one end portion of the container body in its rotational-axis direction, and retains a rotation-halted state while the container body and the transmission gear are rotating. The seal member is placed between the container body and the cap member, and at least partly formed from an elastic material. The transmission gear has a large-diameter portion larger in outer diameter than the other portions. The cap member includes a body portion having a communicating portion communicatable with interior of the container body via the opening, a retaining portion, being cylindrical-shaped, which is protruded from the body portion toward the container body in the rotational-axis direction, and which retains part of both the container body and the transmission gear in the rotational-axis direction, and an engaging portion which is formed on an inner circumferential surface of the retaining portion, and which makes both a flange portion formed on a circumferential edge portion of the opening and the seal member pinched between the engaging portion and the body portion in the rotational-axis direction. A fore end portion of the retaining portion is in contact with a step gap portion on one side of the large-diameter portion closer to the cap member.

DETAILED DESCRIPTION

Figure 1:
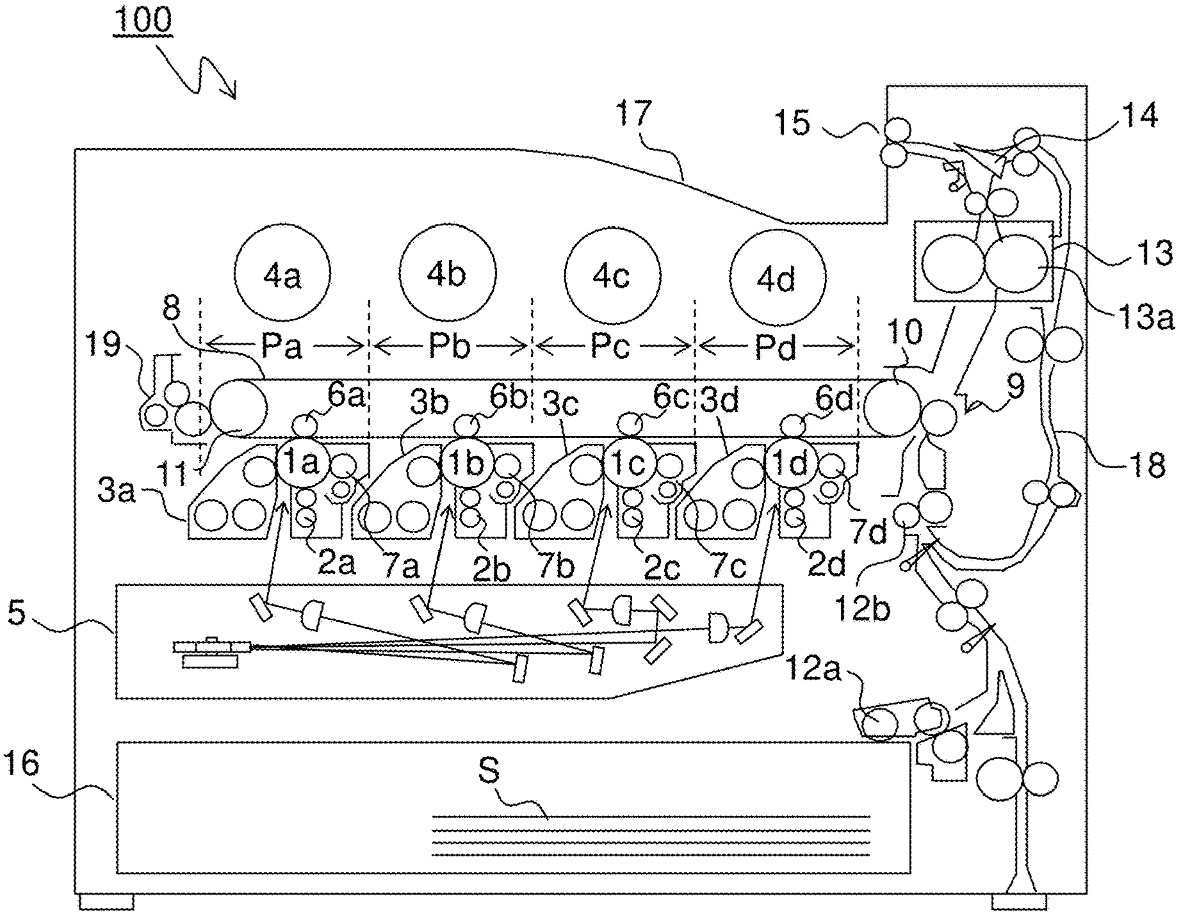
FIG. 1 is a schematic diagram showing an internal configuration of an image forming apparatus in which toner containers according to an embodiment of the present disclosure are mounted.
Figure 2:
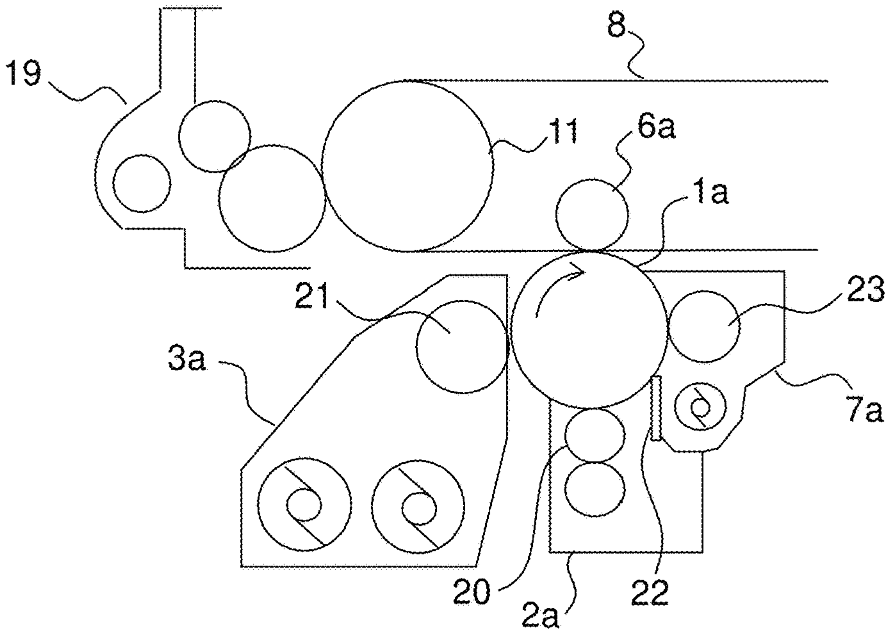
FIG. 2 is an enlarged view of around an image forming part of FIG. 1.

Hereinafter, an embodiment of the present disclosure will be described with reference to the accompanying drawings. FIG. 1 is a schematic diagram showing a configuration of an image forming apparatus 100 in which toner containers 4*a* to 4*d* according to an embodiment of the disclosure are mounted. FIG. 2 is an enlarged view of around an image forming part Pa of FIG. 1.

The image forming apparatus 100 shown in FIG. 1 is a so-called tandem-type color printer, having a configuration described below. In a housing of the image forming apparatus 100, four image forming parts Pa, Pb, Pc, Pd are disposed in this order starting from an upstream side (left side in FIG. 1) in a conveyance direction. These image forming parts Pa to Pd, which are provided in correspondence to images of different four colors (yellow, cyan, magenta and black), form images of yellow, cyan, magenta and black successively each through processes of charging, exposure to light, development and transfer.

These image forming parts Pa, Pb, Pc, Pd are equipped with photosensitive drums 1*a*, 1*b*, 1*c*, 1*d*, respectively, for carrying individual-color visible images (toner images). Further, an intermediate transfer belt 8 that turns counterclockwise in FIG. 1 is provided in adjacency to the image forming parts Pa to Pd. Toner images formed on these photosensitive drums 1*a* to 1*d* are transferred successively onto the intermediate transfer belt 8 that is moving while keeping in contact with the photosensitive drums 1*a* to 1*d*, and thereafter transferred at one time onto a sheet S as an example of a recording medium in a secondary transfer roller 9. Further, after fixation of the toner images on the sheet S in a fixing unit 13, the sheet S is discharged out of the housing of the image forming apparatus 100. While the photosensitive drums 1*a* to 1*d* are rotated clockwise in FIG. 1, image forming process for the individual photosensitive drums 1*a* to 1*d* is executed.

The sheet S, to which toner images are to be transferred, is contained in a sheet cassette 16 placed at a lower portion in the housing of the image forming apparatus 100. The sheet S is conveyed via a feed roller 12*a* and a registration roller pair 12*b* to the secondary transfer roller 9. The intermediate transfer belt 8 is given mostly by using a seamless belt.

Next, the image forming parts Pa to Pd will be described. Whereas the image forming part Pa will be described in detail below, the image forming parts Pb to Pd are basically similar in configuration thereto, so their description being omitted. As shown in FIG. 2, around the photosensitive drum 1*a*, disposed along a drum rotational direction (clockwise direction in FIG. 2) are a charging unit 2*a*, a developing unit 3*a*, and a cleaning unit 7*a*, where a primary transfer roller 6*a* is placed with the intermediate transfer belt 8 pinched against the photosensitive drum 1*a*. Also, a belt cleaning unit 19 opposed to a tension roller 11 with the intermediate transfer belt 8 pinched therebetween is placed on an upstream side of the photosensitive drum 1*a* in a turning direction of the intermediate transfer belt 8.

Next, image formation procedure in the image forming apparatus 100 will be described. Upon input of a start for image formation from a user, the photosensitive drums 1*a* to 1*d* first start to be rotated by a main motor (not shown), and surfaces of the photosensitive drums 1*a* to 1*d* are uniformly electrically charged by charging rollers 20 of the charging units 2*a* to 2*d*, respectively. Subsequently, the surfaces of the photosensitive drums 1*a* to 1*d* are illuminated with optical beams (laser light) emitted from an exposure unit 5, so that electrostatic latent images corresponding to image signals are formed on the photosensitive drums 1*a* to 1*d*, respectively.

The developing units 3*a* to 3*d* are filled to specified quantities with individual-color toner of yellow, cyan, magenta and black, respectively. It is noted that when a ratio of toner contained in two-component developer filled in the developing units 3*a* to 3*d* has become lower than a predetermined value due to later-described formation of toner images, the developing units 3*a* to 3*d* are refilled with toner from the toner containers 4*a* to 4*d*, respectively. This toner in the developer is fed, by developing rollers 21 of the developing units 3*a* to 3*d*, onto the photosensitive drums 1*a* to 1*d*, respectively, so as to be electrostatically deposited thereon. As a result of this, a toner image corresponding to an electrostatic latent image formed by exposure from the exposure unit 5 is formed.

Then, by the primary transfer rollers 6*a* to 6*d*, electric fields are given at a specified transfer voltage to between the primary transfer rollers 6*a* to 6*d* and the photosensitive drums 1*a* to 1*d*, respectively, so that toner images of yellow, cyan, magenta and black on the photosensitive drums 1*a* to 1*d* are primarily transferred onto the intermediate transfer belt 8. These images of four colors are formed with a specified positional relationship which is predetermined for specified full-color image formation. Thereafter, in preparation for subsequent formation of new electrostatic latent images, toner remaining on the surfaces of the photosensitive drums 1*a* to 1*d* is eliminated by cleaning blades 22 and rubbing rollers 23 of cleaning units 7*a* to 7*d*, respectively.

As the intermediate transfer belt 8 has started to turn counterclockwise along with rotation of the driving roller 10 by a belt driving motor (not shown), the sheet S is conveyed at a specified timing from the registration roller pair 12*b* to a secondary transfer roller 9 provided in adjacency to the intermediate transfer belt 8, followed by transfer of the full-color image. The sheet S, to which the toner image has been transferred, is conveyed to the fixing unit 13. Toner remaining on the surface of the intermediate transfer belt 8 is eliminated by the belt cleaning unit 19.

The sheet S conveyed to the fixing unit 13 is heated and pressurized by a fixing roller pair 13*a* so that the toner image is fixed on the surface of the sheet S, with a specified full-color image formed. The sheet S with the full-color image formed thereon is assorted in conveyance direction by a branching part 14 that branches into a plurality of directions, and the sheet S is discharged, as it is (or after fed to a double-sided conveyance path 18 and subjected to double-sided printing), to a discharge tray 17 by a discharge roller pair 15.

Figure 3:
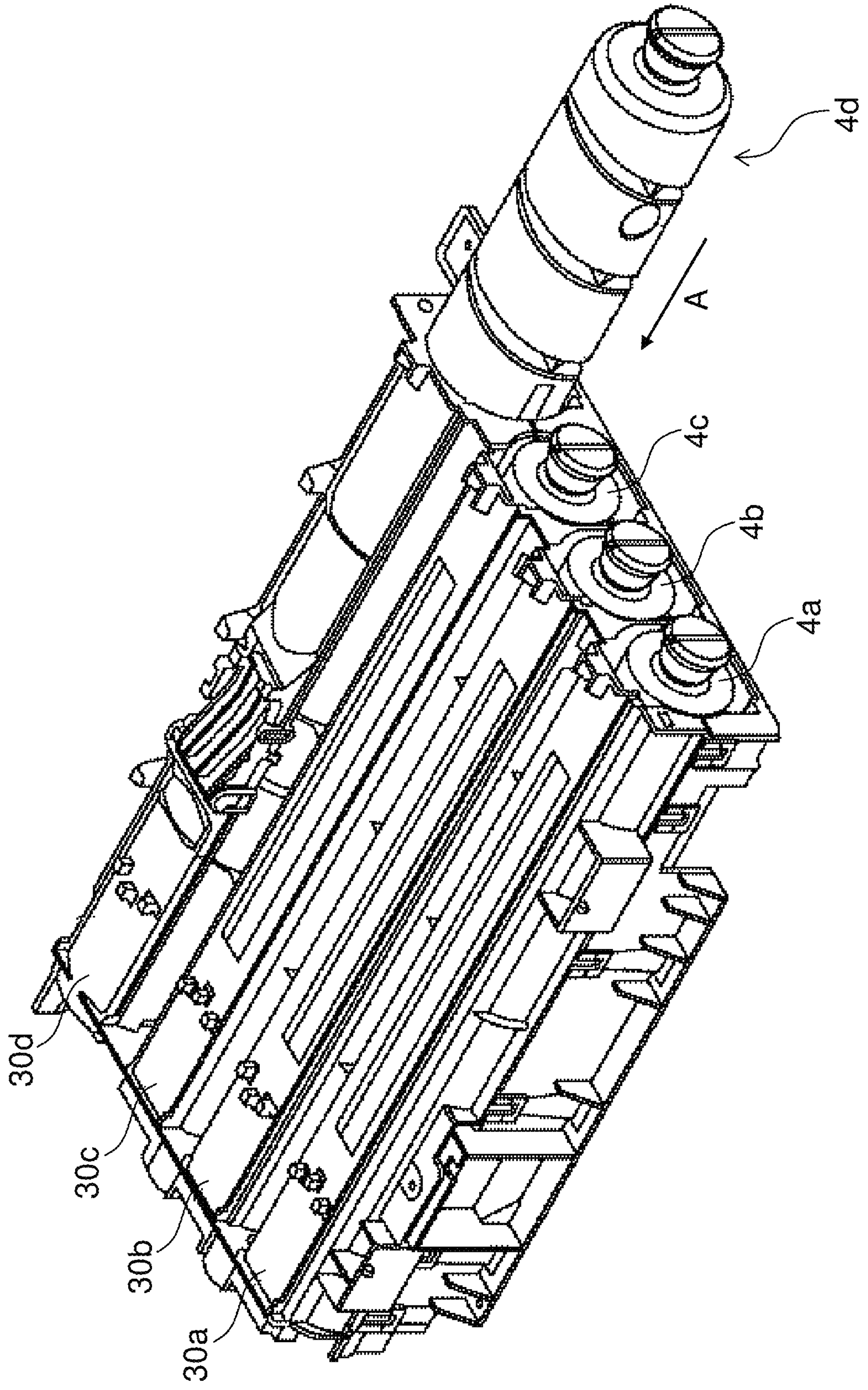
FIG. 3 is a perspective view showing toner containers and container fitting portions in the embodiment.

Next, the toner containers 4*a* to 4*d* will be described. FIG. 3 is a perspective view showing the toner containers 4*a* to 4*d* and container fitting portions 30*a* to 30*d*. In FIG. 3, only the toner container 4*d* is shown as it is halfway on its fitting to the container fitting portion 30*d* while the toner containers 4*a* to 4*c* are shown as they have completely been fitted to the container fitting portions 30*a* to 30*c*, respectively.

As shown in FIG. 3, the toner containers 4*a* to 4*d* are fitted to the container fitting portions 30*a* to 30*d*, respectively, along their insertion direction headed from fore side (right near side in FIG. 3) toward rear side (left far side in FIG. 3) of the image forming apparatus 100. The container fitting portions 30*a* to 30*d* are arrayed in a left/right direction. The container fitting portions 30*a* to 30*d* are each formed into a cylindrical shape extending in a longitudinal (front/rear) direction. An outer diameter of the toner container 4*d* in which in black toner is contained is larger than an outer diameter of the toner containers 4*a* to 4*c* in which toner of yellow, cyan and magenta, respectively, is contained. An inner diameter of the container fitting portion 30*d* is larger than an inner diameter of the container fitting portions 30*a* to 30*c*.

A toner refill port 303 (see FIG. 8) is provided at a lower portion of each of the container fitting portions 30*a* to 30*d* and on a downstream side of the toner-container insertion direction. The toner refill port 303 is communicated with interior of each of the developing units 3*a* to 3*d* of the image forming parts Pa to Pd, respectively, via a refill tube 304 (see FIG. 8) extending in an up/down direction.

Figure 4:
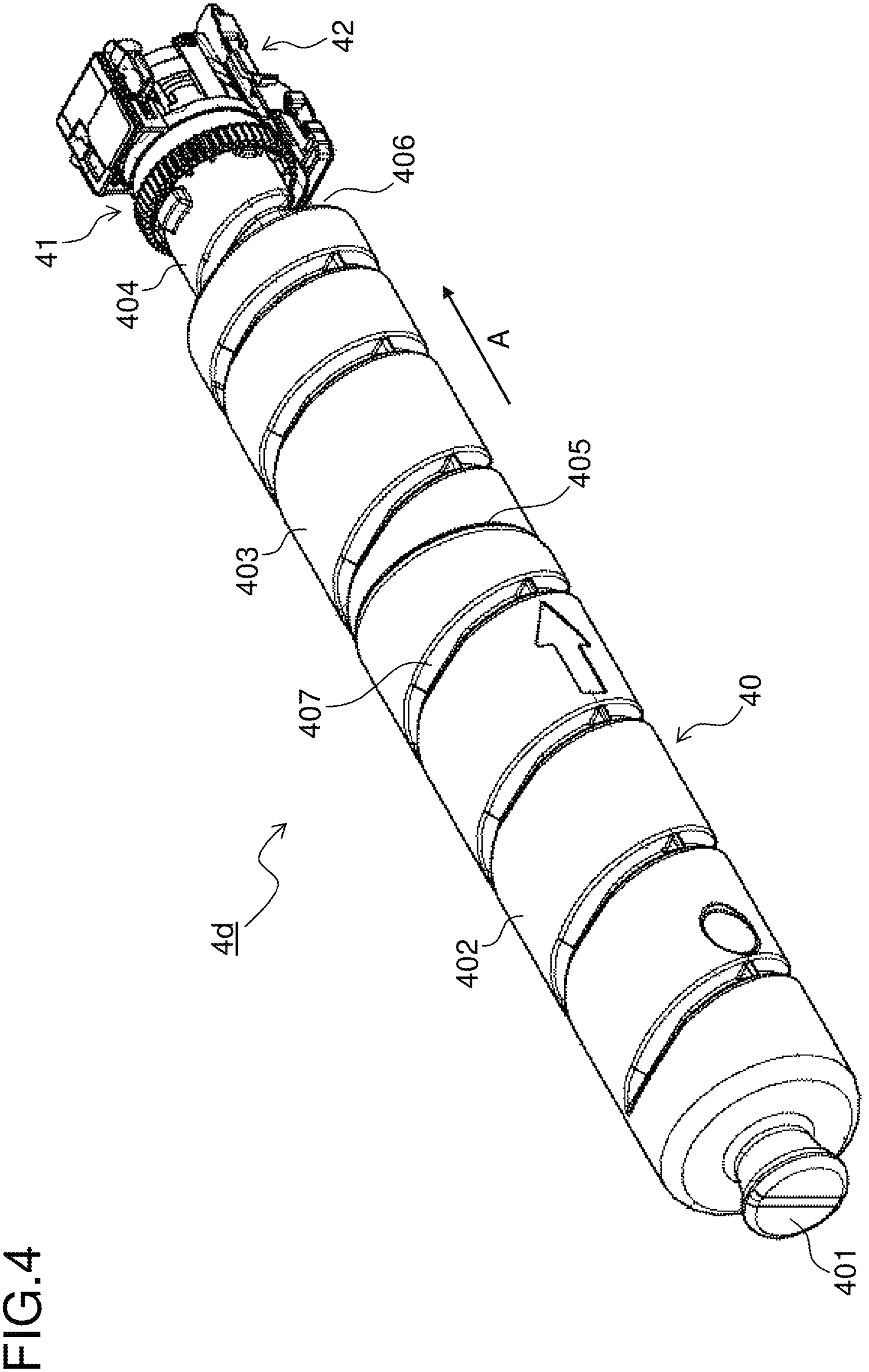
FIG. 4 is a perspective view of a toner container according to the embodiment, as viewed from an upstream side in its insertion direction.
Figure 5:
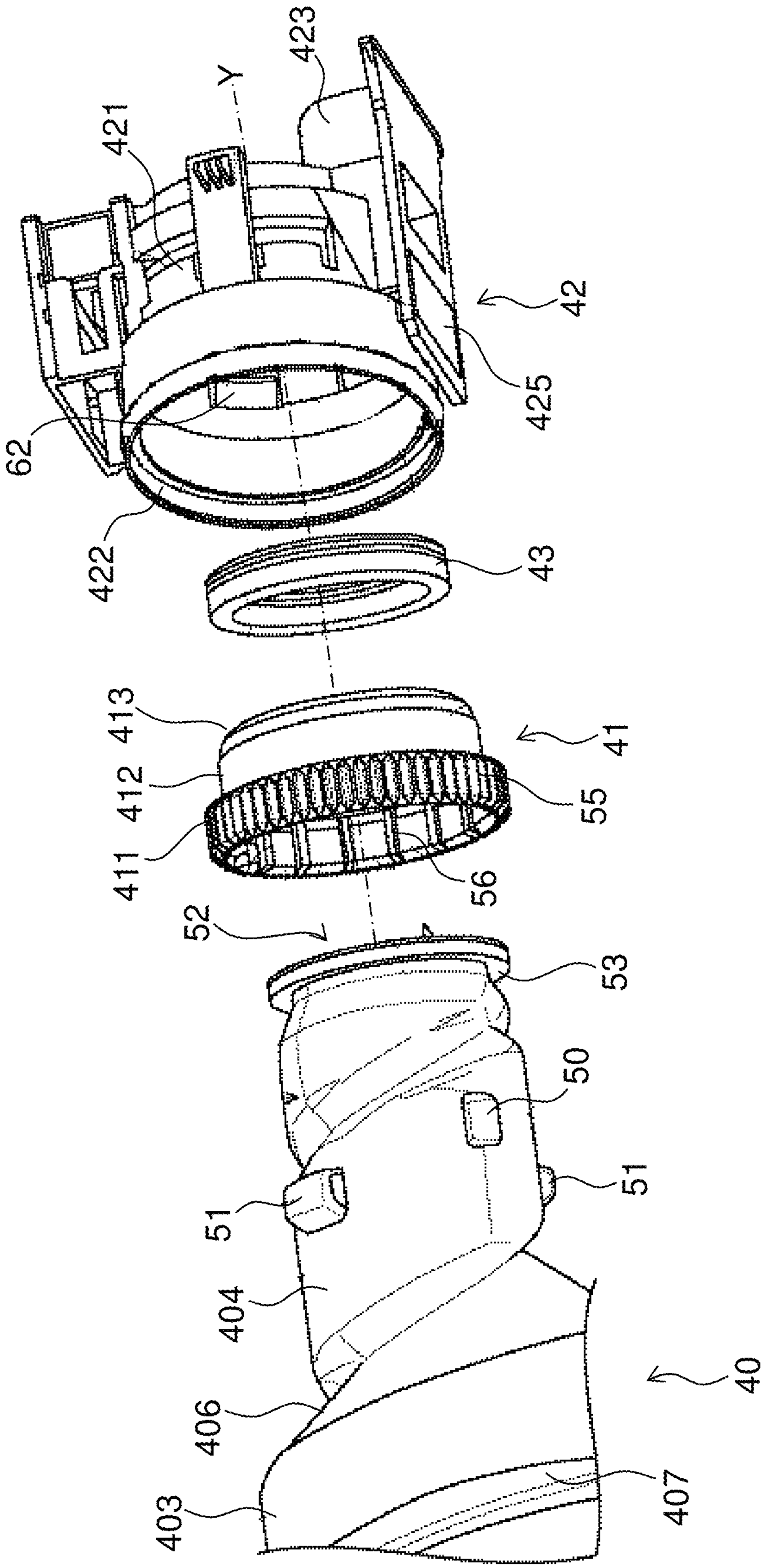
FIG. 5 is an exploded perspective view of a downstream-side end portion of the toner container according to the embodiment, as viewed in its insertion direction.
Figure 6:
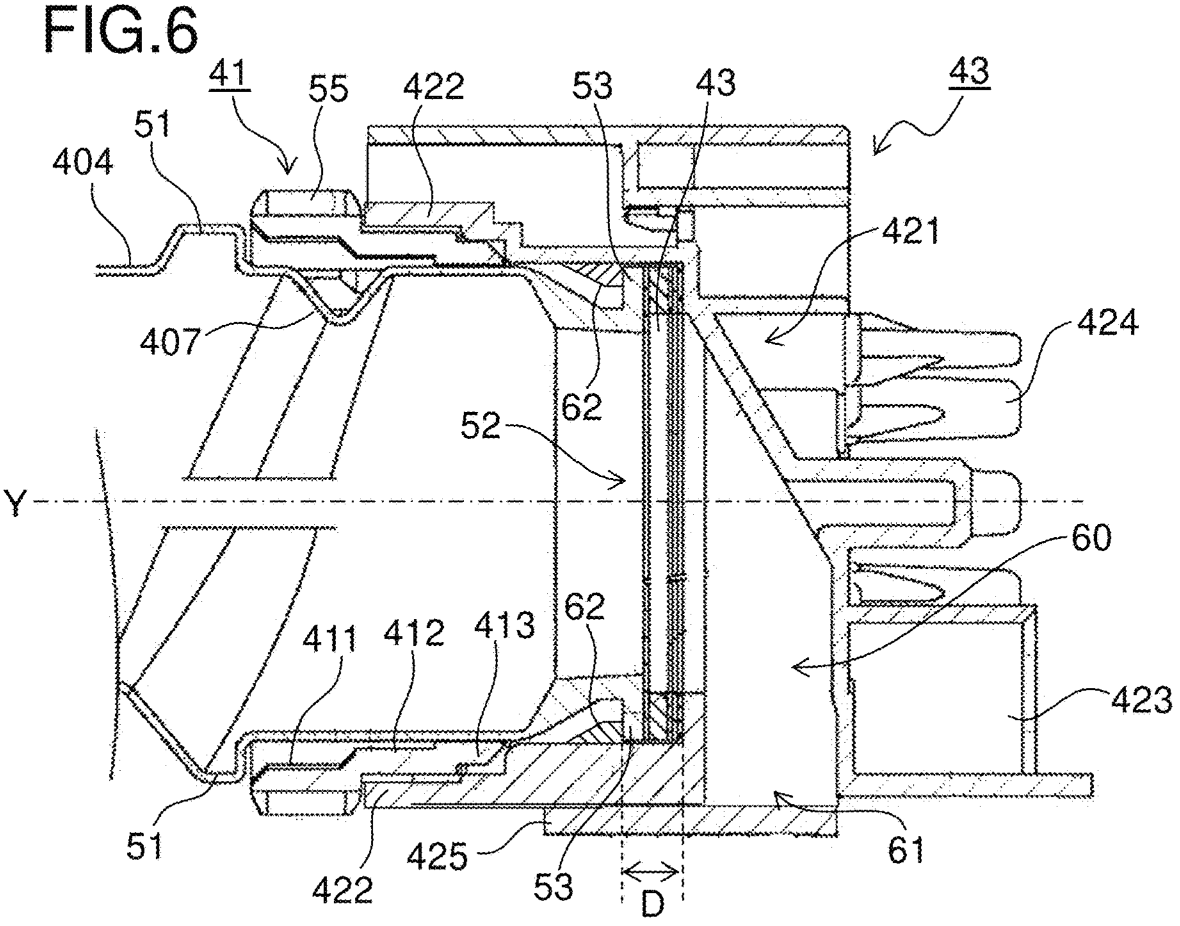
FIG. 6 is a sectional view of a downstream-side end portion of the toner container according to the embodiment, as viewed in its insertion direction and as cut along its axial direction.

FIG. 4 is a perspective view of a toner container 4*d* according to the embodiment, as viewed from an upstream side in its insertion direction. FIG. 5 is an exploded perspective view of a downstream-side (right far side of FIG. 4) end portion of the toner container 4*d* according to the embodiment, as viewed in its insertion direction. FIG. 6 is a sectional view of a downstream-side end portion of the toner container 4*d* according to the embodiment, as viewed in its insertion direction and as cut along its axial direction. Although the toner container 4*d* for containing toner of black will be described below, the toner containers 4*a* to 4*c* for containing toner of yellow, cyan and magenta, respectively, are similar in configuration to the toner container 4*d*.

As shown in FIGS. 4 and 5, the toner container 4*d* includes a container body 40, a transmission gear 41 fitted to a rear portion of the container body 40, a cap member 42 provided on a rear side of the transmission gear 41, and a seal member 43 housed inside the cap member 42.

The container body 40 is formed into a cylindrical shape extending along the insertion direction (arrow A direction) relative to the container fitting portion 30*d*. In this embodiment, a front/rear direction of the image forming apparatus 100 is a longitudinal direction of the container body 40. The container body 40 is made up so as to be rotatable about a rotational axis Y extending in the longitudinal direction. Toner of black (not shown) is contained inside the container body 40. The toner contained inside the container body 40 is conveyed from front side toward rear side (from upstream side toward downstream side of insertion direction) of the image forming apparatus 100.

The container body 40 has a handle portion 401, a large-diameter cylindrical portion 402 provided downstream of the handle portion 401 in a toner conveyance direction (arrow A direction), a middle-diameter cylindrical portion 403 provided downstream of the large-diameter cylindrical portion 402, and a small-diameter cylindrical portion 404 provided downstream of the middle-diameter cylindrical portion 403.

The handle portion 401 is provided at an upstream-side end portion of the container body 40 in its insertion direction. An inner space of the handle portion 401 is communicated with an inner space of the large-diameter cylindrical portion 402. The large-diameter cylindrical portion 402, the middle-diameter cylindrical portion 403, and the small-diameter cylindrical portion 404 are formed each into a cylindrical shape centered on the rotational axis Y. The middle-diameter cylindrical portion 403 is provided between the large-diameter cylindrical portion 402 and the small-diameter cylindrical portion 404. The middle-diameter cylindrical portion 403 is smaller in outer diameter than the large-diameter cylindrical portion 402 and larger in outer diameter than the small-diameter cylindrical portion 404.

On an outer circumferential surface of the container body 40, a first step-gap portion 405 having a generally annular shape is formed between the large-diameter cylindrical portion 402 and the middle-diameter cylindrical portion 403, and a second step-gap portion 406 having a spiral shape is formed between the middle-diameter cylindrical portion 403 and the small-diameter cylindrical portion 404. The first step-gap portion 405 has a step gap (difference in outer diameter between the large-diameter cylindrical portion 402 and the middle-diameter cylindrical portion 403) smaller than a step gap (difference in outer diameter between the middle-diameter cylindrical portion 403 and the small-diameter cylindrical portion 404) of the second step-gap portion 406.

One spiral conveyance rib 407 is continuously provided on inner circumferential surfaces of the large-diameter cylindrical portion 402, the middle-diameter cylindrical portion 403, and the small-diameter cylindrical portion 404 in the container body 40. The conveyance rib 407 projects, in a generally V shape in a sectional view, from the inner circumferential surface of the container body 40 toward radially inner side.

On an outer circumferential surface of the small-diameter cylindrical portion 404, a pair of first engaging protrusions 50 (rotation restricting portions) are provided. One of the paired first engaging protrusions 50 is placed so as not to overlap with the conveyance rib 407. The other of the paired first engaging protrusions 50 is placed so as to overlap with the conveyance rib 407. The pair of first engaging protrusions 50 are provided at positions of point symmetry relative to the rotational axis Y.

On the outer circumferential surface of the small-diameter cylindrical portion 404, a pair of second engaging protrusions 51 (movement restricting portions) are provided. The second engaging protrusions 51 are placed so as neither to overlap with the conveyance rib 407. The second engaging protrusions 51 are placed with a circumferential-direction positional shift of 90 degrees relative to the first engaging protrusions 50, respectively. That is, the pair of first engaging protrusions 50 and the pair of second engaging protrusions 51 are placed so as not to overlap with each other, respectively, in terms of their circumferential-direction positions.

A circular-shaped opening 52 is provided at a downstream-side end portion of the small-diameter cylindrical portion 404 in the insertion direction. On a circumferential edge portion of the opening 52, a ring-shaped flange portion 53 is provided so as to protrude radially outward.

The transmission gear 41 is fitted to the outer circumferential surface of the small-diameter cylindrical portion 404 in the container body 40. The transmission gear 41 is formed into a cylindrical shape centered on the rotational axis Y. The transmission gear 41 has a large-diameter portion 411, a middle-diameter portion 412 provided downstream of the large-diameter portion 411 in the toner conveyance direction, and a small-diameter portion 413 provided downstream of the middle-diameter portion 412. In the transmission gear 41, its outer diameter decreases more and more in order of the large-diameter portion 411 to the middle-diameter portion 412 to the small-diameter portion 413.

On an outer circumferential surface of the large-diameter portion 411, gear teeth 55 are provided. A diameter of the large-diameter portion 411 including the gear teeth 55 is smaller than the outer diameters of the large-diameter cylindrical portion 402 and the middle-diameter cylindrical portion 403 in the container body 40, and meanwhile larger than the outer diameter of the small-diameter cylindrical portion 404. An upstream-side end portion of the large-diameter portion 411 in the insertion direction is opposed to the second engaging protrusions 51 of the container body 40.

Over whole inner circumferential surfaces of the large-diameter portion 411 and the middle-diameter portion 412 in the transmission gear 41, a plurality of engaging ribs 56 extending along the insertion direction are provided. The plurality of engaging ribs 56 are provided with specified circumferential intervals therebetween (e.g., 10 to 20 ribs at equal intervals).

The one pair of first engaging protrusions 50 are inserted between two sets of engaging ribs 56, respectively, out of the plurality of engaging ribs 56. As a result of this, rotation of the transmission gear 41 relative to the container body 40 is restricted. It is noted that the engaging ribs 56 other than the above-mentioned two sets of engaging ribs 56 (engaging ribs 56 into which no first engaging protrusion 50 is inserted) function as reinforcers for reinforcing the transmission gear 41.

The cap member 42 covers the opening 52 of the container body 40. The cap member 42 has a body portion 421, a retaining portion 422 extending from the body portion 421 toward insertion-direction upstream side, an engaging cylindrical portion 423 protruding from the body portion 421 toward insertion-direction downstream side, a cover-side restricting portion 424 provided on an upper side of the engaging cylindrical portion 423, and a cover-side shutter 425 provided on a lower side of the body portion 421, the retaining portion 422 and the engaging cylindrical portion 423.

Inside the body portion 421, a communicating portion 60 is provided so as to be communicatable with a toner containing space of the container body 40 via the opening 52 of the container body 40. At a lower end of the communicating portion 60, a toner discharge port 61 is provided.

The retaining portion 422 is formed into a generally cylindrical shape centered on the rotational axis Y so as to protrude from the body portion 421 toward the container body 40 side. An inner circumferential surface of the retaining portion 422 is opposed to the outer circumferential surfaces of the middle-diameter portion 412 and the small-diameter portion 413 in the transmission gear 41. On the inner circumferential surface of the retaining portion 422 of the cap member 42, a total of four engaging portions 62 are provided. Each engaging portion 62 holds the flange portion 53 (downstream-side end portion in insertion direction) and the seal member 43 pinched in a clearance D against the body portion 421. The clearance D is narrower than a sum of thicknesses of the flange portion 53 and the seal member 43. Therefore, the seal member 43 is compressed to a specified thickness, so that scalability between the container body 40 and the cap member 42 is maintained.

The retaining portion 422 holds the transmission gear 41 pinched against the second engaging protrusions 51 of the container body 40. As a result, insertion-direction movement of the transmission gear 41 relative to the container body 40 is restricted while the transmission gear 41 is prevented from dropping off from the container body 40.

The seal member 43 is formed into a ring shape and placed radially inside the retaining portion 422 of the cap member 42. The seal member 43 is placed, in a compressed state, between the flange portion 53 of the container body 40 and the body portion 421 of the cap member 42.

The seal member 43 is fixed to a surface (upstream-side surface in insertion direction) of the body portion 421 of the cap member 42, the surface being opposed to the flange portion 53. In addition, although the seal member 43 may be fixed to the flange portion 53 of the container body 40, yet there is a possibility that with the seal member 43 fixed to the flange portion 53, the seal member 43 may be damaged by making contact with the retaining portion 422 during fitting of the cap member 42 to the container body 40. Therefore, in terms of assemblability of the toner container 4*d*, it is preferable to fix the seal member 43 to the body portion 421 of the cap member 42.

Figure 7:
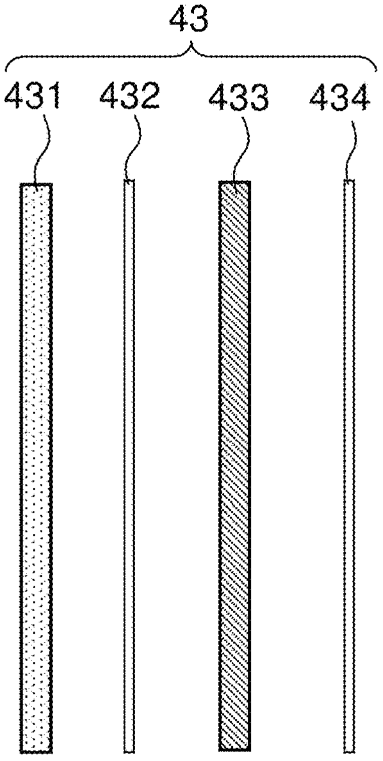
FIG. 7 is an exploded view showing a layer structure of a seal member.

FIG. 7 is an exploded view showing a layer structure of the seal member 43. The seal member 43 includes a first seal layer 431, a first adhesion layer 432, a second seal layer 433, and a second adhesion layer 434. The first seal layer 431, forming a topmost layer of the seal member 43, is opposed to the flange portion 53 of the container body 40. The first seal layer 431 is formed from, for example, urethane foam, which is an elastic material. The first adhesion layer 432 is stacked on a back side (downstream side in insertion direction) of the first seal layer 431. The first adhesion layer 432 is formed of, for example, double-sided tape to adhesively bond the first seal layer 431 and the second seal layer 433 together.

The second seal layer 433 is stacked on a back side (downstream side in insertion direction) of the first adhesion layer 432. The second seal layer 433 has a thickness occupying 50% or more of a whole thickness of the seal member 43. The second seal layer 433 is formed from, for example, urethane foam, which is an elastic material. The second adhesion layer 434 is stacked on a back side (downstream side in insertion direction) of the second seal layer 433. The second adhesion layer 434 is formed of, for example, double-sided adhesive tape to adhesively bond the second seal layer 433 and the body portion 421 of the cap member 42 together.

Next, an operation of fitting the toner containers 4*a* to 4*d* to the container fitting portions 30*a* to 30*d* will be described. In addition, because the fitting operation is similar among the toner containers 4*a* to 4*d*, only the operation of fitting the toner container 4*d* to the container fitting portion 30*d* will be described below, and description of operations of fitting the toner containers 4*a* to 4*c* to the container fitting portions 30*a* to 30*c*, respectively, will be omitted.

In course of fitting the toner container 4*d* to the container fitting portion 30*d*, as shown in FIG. 2, the toner container 4*d* is inserted into the container fitting portion 30*d*, starting with a downstream-side end portion (cap member 42 side end portion) of the toner container 4*d* in its insertion direction.

Figure 8:
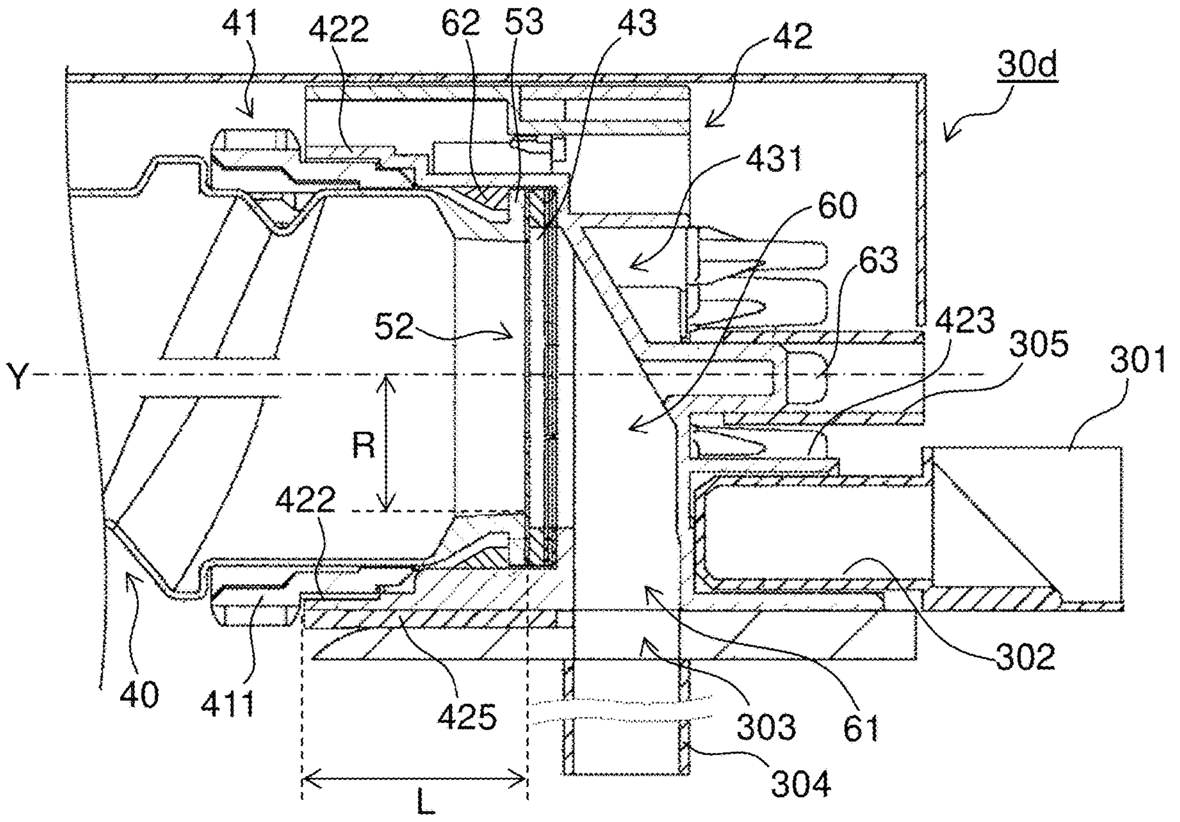
FIG. 8 is a sectional view of a downstream-side end portion of the toner container, as viewed in its insertion direction and as cut along its axial direction, where the toner container has been fitted to the container fitting portion.

FIG. 8 is a sectional view of a downstream-side end portion of the toner container 4*d*, as viewed in its insertion direction and as cut along its axial direction, where the toner container 4*d* has been fitted to the container fitting portion 30*d*. When the toner container 4*d* has been fitted to the container fitting portion 30*d*, the body portion 421 of the cap member 42 presses a boss 302 of a fitting portion-side shutter 301 of the container fitting portion 30*d* while the engaging cylindrical portion 423 of the cap member 42 in the toner container 4*d* keeps engaged with the boss 302, as shown in FIG. 8. As a result of this, the fitting portion-side shutter 301 is moved from a closure position to an open position, allowing the toner refill port 303 of the container fitting portion 30*d* to be opened.

Also, when the toner container 4*d* has been fitted to the container fitting portion 30*d*, the cover-side shutter 425 provided in the cap member 42 is moved from a closure position to an open position, allowing the toner discharge port 61 of the body portion 421 in the cap member 42 to be opened. As a result, the communicating portion 60 of the body portion 421 is communicated with the refill tube 304.

Also, when the toner container 4*d* has been fitted to the container fitting portion 30*d* as described above, a fit-in protrusion 63 provided in the cover-side restricting portion 424 of the cap member 42 in the toner container 4*d* is fitted into a fitting portion-side restricting portion 305 of the container fitting portion 30*d*. As a result of this, the toner container 4*d* is positioned relative to the container fitting portion 30*d*.

Next, an operation of refilling toner from the toner container 4*d* to the developing unit 3*d* of the image forming part Pd in the image forming apparatus 100 will be described. In addition, operations of refilling toner from the toner containers 4*a* to 4*c* to the developing units 3*a* to 3*c* of the image forming parts Pa to Pc, respectively, are similar to that of the toner container 4*d*, and therefore their description is omitted.

In the course of refilling toner from the toner container 4*d* to the developing unit 3*d* of the image forming part Pd, a toner refilling motor (not shown) is driven with the toner container 4*d* fitted to the container fitting portion 30*d* as shown in FIG. 7. As a result, rotation driving force from the toner refilling motor is transmitted via a gear train and a drive input gear (neither shown) to the transmission gear 41 of the toner container 4*d*, causing the transmission gear 41 to be rotated.

As the transmission gear 41 is rotated, the container body 40 of the toner container 4*d* is resultantly rotated integrally with the transmission gear 41. That is, the rotation driving force derived from the toner refilling motor is transmitted to the container body 40 by the transmission gear 41.

Meanwhile, the cap member 42 and the seal member 43 of the toner container 4*d* keep in a rotation-halted state without being rotated during the rotation of the container body 40. Therefore, the container body 40 is rotated relative to the cap member 42 and the seal member 43.

When the container body 40 is rotated, toner within the container body 40 is conveyed from upstream side toward downstream side of the toner conveyance direction by the conveyance rib 407 of the container body 40, being discharged from the container body 40 via the opening 52. The toner discharged from the container body 40 via the opening 52 is introduced to the communicating portion 60 of the body portion 421 in the cap member 42. The toner introduced to the communicating portion 60 is discharged from the communicating portion 60 via the toner discharge port 61 of the body portion 421. The toner discharged from the communicating portion 60 via the toner discharge port 61 is introduced to the refill tube 304 via the toner refill port 303 of the container fitting portion 30*d*, being refilled from the refill tubes 304 into the developing unit 3*d* of the image forming part Pd.

As described above, with the toner containers 4*a* to 4*d* fitted to the container fitting portions 30*a* to 30*d*, respectively, only the flange portion 53 (downstream-side end portion in insertion direction) of the container body 40 is retained by the cap member 42. With this configuration, there are some cases where the container body 40 is tilted downward relative to the cap member 42 due to weight of toner contained inside the container body 40 as well as self weight of the container body 40. In such a state, when the container body 40 is rotated, a load applied to lower part of the seal member 43 becomes larger, leading to occurrence of partial wear or exhaustion of the seal member 43.

In the course of fitting the toner containers 4*a* to 4*d* to the container fitting portions 30*a* to 30*d*, respectively, when the container body 40 is pushed inward to an extent deeper than a specified position, the seal member 43 is excessively compressed. The seal member 43, when stored in that state for a long period, would yield to exhaustion.

Upon occurrence of wear or exhaustion of the seal member 43, toner is more likely to leak from between the container body 40 and the cap member 42. Also, since the seal member 43 becomes shorter in service life, there arises a need for replacing the seal member 43 on occasions when toner is filled, for reuse, into the used toner containers 4*a* to 4*d*, hence lowered reusability.

Figure 9:
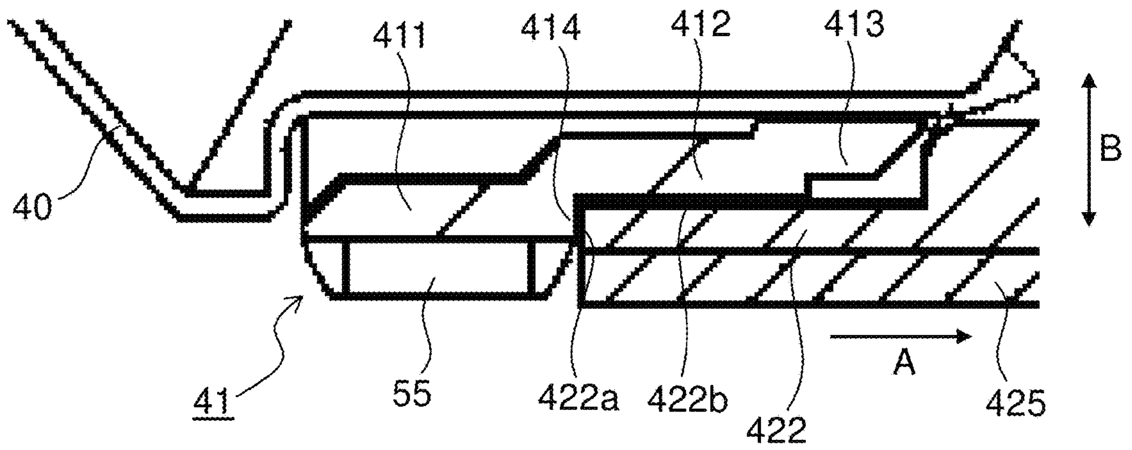
FIG. 9 is an enlarged view of a contact portion between a transmission gear and a retaining portion of a cap member in FIG. 8.

FIG. 9 is an enlarged view of a contact portion between the transmission gear 41 and the retaining portion 422 of the cap member 42 in FIG. 8. In this embodiment, as shown in FIG. 9, the retaining portion 422 of the cap member 42 is lengthened toward the container body 40 side (upstream side in insertion direction). In more detail, a fore end portion 422*a* of the retaining portion 422 is set in contact with a step gap portion 414 between the large-diameter portion 411 and the middle-diameter portion 412 of the transmission gear 41.

With this configuration, the container body 40 and the cap member 42 are restricted in position in the longitudinal direction (rotational axis Y direction) by the contact between the fore end portion 422*a* of the retaining portion 422 and the step gap portion 414 of the transmission gear 41. Accordingly, even when the toner containers 4*a* to 4*d* are strongly pushed in to the container fitting portions 30*a* to 30*d*, respectively, the seal member 43 is kept from action of pressing force. That is, since the compressed state of the seal member 43 is maintained constant by the clearance D between the engaging portions 62 and the body portion 421, exhaustion of the seal member 43 due to excessive compression can be suppressed.

Further, the inner circumferential surface 422*b* of the retaining portion 422 is set in contact with the outer circumferential surface of the middle-diameter portion 412 of the transmission gear 41. With this configuration, portions of the container body 40 and the transmission gear 41 which range from the flange portion 53 to the step gap portion 414 of the transmission gear 41 are axially supported by the cap member 42. As a result, an axial retaining length of the container body 40 and the transmission gear 41 becomes so large that a load with which the container body 40 tends to be tilted downward can be held not only by vicinities of the seal member 43 but also by axial diffusion of the load.

Furthermore, the container body 40 and the cap member 42 are restricted in radial (in a direction perpendicular to the rotational axis Y) position by a contact between the inner circumferential surface 422*b* of the retaining portion 422 and the middle-diameter portion 412 of the transmission gear 41. In this connection, a tilt quantity of the container body 40 is determined by a vicinity (axial support portion) of the seal member 43 or the retaining portion 422 (longitudinal support portion), whichever it is the one of smaller radial clearance (backlash). Because, normally, fit-in between the inner circumferential surface 422*b* of the retaining portion 422 and the middle-diameter portion 412 of the transmission gear 41 is capable of more easily obtaining dimensional accuracy, lengthening the retaining portion 422 allows further radial-position restricting effect to be obtained more easily. Preferably, a distance (axial support distance) ranging from the flange portion 53 to the fore end portion 422*a* of the retaining portion 422 is set larger than a radius R of the opening 52.

As described above, according to this embodiment, tilt of the container body 40 can be restricted without applying any excessive load to the seal member 43, so that toner leakage of the toner containers 4*a* to 4*d* can be suppressed. Further, wear or exhaustion of the seal member 43 can also be suppressed, leading to longer service life of the seal member 43. Thus, there can be provided toner containers 4*a* to 4*d* that are capable of prolonged use and moreover repetitive use enabled by refilling of toner.

Without being limited to the above-described embodiment, the present disclosure may be changed and modified in various ways unless those changes and modifications depart from the gist of the disclosure. For example, in the above embodiment, the large-diameter portion 411 of the transmission gear 41 is provided at an end portion on one side of the transmission gear 41 farther from the cap member 42 in the rotational-axis direction, and the gear teeth 55 are formed on the outer circumferential surface of the large-diameter portion 411. However, this is not limitative, and the gear teeth 55 may also be formed at a portion other than the large-diameter portion 411 of the transmission gear 41.

Figure 10:
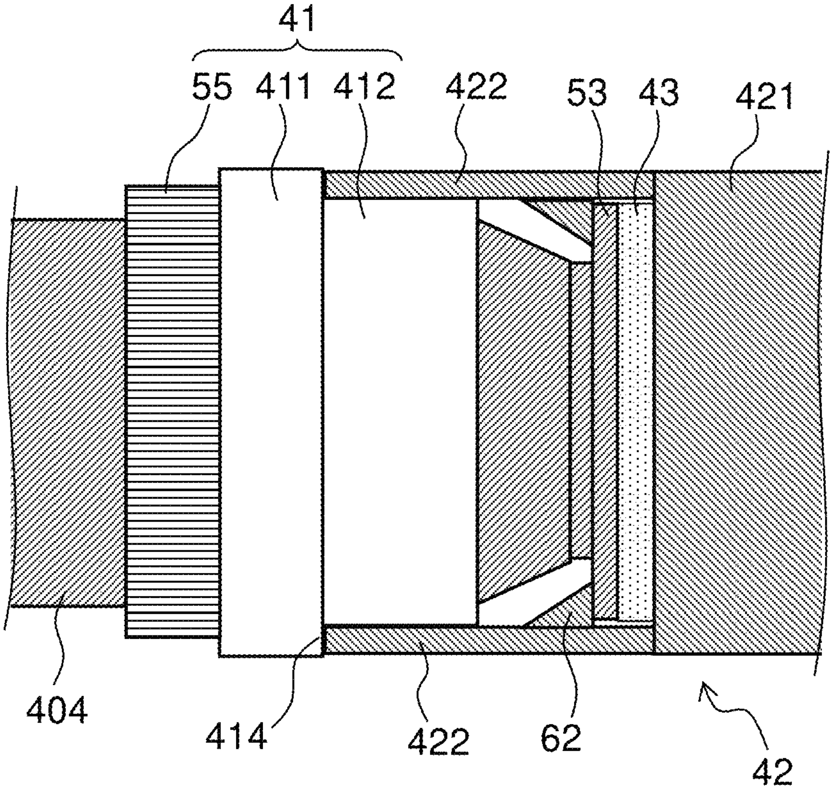
FIG. 10 is a side view schematically showing a connecting portion between a container body and the cap member in a toner container according to a modification of the embodiment.

For instance, like a modification shown in FIG. 10, the large-diameter portion 411 may be provided at a generally central portion of the transmission gear 41 in the rotational-axis direction, and the gear teeth 55 may be formed at an end portion on one side of the transmission gear 41 farther from the cap member 42. With this configuration as well, the retaining portion 422 of the cap member 42 makes contact with the step gap portion 414 on one side (downstream side in insertion direction) of the large-diameter portion 411 closer to the cap member 42, so that the container body 40 and the cap member 42 are restricted in terms of their longitudinal positions. Further, by the retaining portion 422 making contact with the outer circumferential surface of the middle-diameter portion 412 of the transmission gear 41, the container body 40 and the cap member 42 are restricted in terms of their radial positions.

The above embodiment has been described about the toner containers 4*a* to 4*d* which contain toner for refilling the developing units 3*a* to 3*d*, respectively, and which are mounted on the image forming apparatus 100 with the developing units 3*a* to 3*d* mounted thereon, the developing units 3*a* to 3*d* being of the two-component development method using two-component developer containing magnetic carrier and toner. However, the present disclosure is applicable similarly also to toner containers which contain toner for refilling developing units of the magnetic one-component development method using magnetic toner or developing units of the nonmagnetic one-component development method using nonmagnetic toner.

Furthermore, the present disclosure is applicable to a variety of image forming apparatuses using toner containers, such as not only tandem-type color printers as shown in FIG. 1 but also color copiers or color multifunction peripherals as well as monochromatic printers or monochromatic copiers or monochromatic multifunction peripherals.

This disclosure can be exploited for toner containers which contain toner therein. Exploiting the disclosure makes it possible to provide toner containers, as well as image forming apparatuses including such toner containers, in which wear or distortion of the seal member can be suppressed by reducing variations of pressing force acting on the seal member.

What is claimed is:

1. A toner container comprising:

a container body, being cylindrical-shaped, which rotates while containing toner;

a transmission gear, being cylindrical-shaped, which is fitted to a one-end-side outer circumferential surface of the container body under a circumferential-movement restricted condition, and which transmits rotation driving force to the container body;

a cap member which covers an opening provided at one end portion of the container body in its rotational-axis direction, and which retains a rotation-halted state while the container body and the transmission gear are rotating; and a seal member which is placed between the container body and the cap member, and which is at least partly formed from an elastic material, the toner container being fittable to and removable from an image forming apparatus, wherein the transmission gear has a large-diameter portion larger in outer diameter than the other portions, and the cap member includes:

a body portion having a communicating portion communicatable with interior of the container body via the opening;

a retaining portion, being cylindrical-shaped, which is protruded from the body portion toward the container body in the rotational-axis direction, and which retains part of both the container body and the transmission gear in the rotational-axis direction; and an engaging portion which is formed on an inner circumferential surface of the retaining portion, and which makes both a flange portion formed on a circumferential edge portion of the opening and the seal member pinched between the engaging portion and the body portion in the rotational-axis direction, and a fore end portion of the retaining portion is in contact with a step gap portion on one side of the large-diameter portion closer to the cap member.

2. The toner container according to claim 1, wherein the inner circumferential surface of the retaining portion is in contact with an outer circumferential surface of the transmission gear on one side closer to the cap member than to the step gap portion.

3. The toner container according to claim 1, wherein a distance from the fore end portion of the retaining portion to the opening is larger than a radius of the opening.

4. The toner container according to claim 1, wherein the large-diameter portion is formed at an end portion of the transmission gear on its one side farther from the cap member in the rotational-axis direction, and gear teeth are formed on an outer circumferential surface of the large-diameter portion.

5. An image forming apparatus comprising:

the toner container according to claim 1; and a fitting portion to which the toner container is fitted.

* * * * *